United States Patent
Marks

(10) Patent No.: US 10,307,917 B2
(45) Date of Patent: Jun. 4, 2019

(54) CUTTING BLADE FOR OSCILLATING TOOL

(71) Applicant: WORKTOOLS, INC., Chatsworth, CA (US)

(72) Inventor: Joel S. Marks, Sherman Oaks, CA (US)

(73) Assignee: WorkTools, Inc., Chatsworth, CA (US)

( * ) Notice: Subject to any disclaimer, the term of this patent is extended or adjusted under 35 U.S.C. 154(b) by 424 days.

(21) Appl. No.: 14/532,852

(22) Filed: Nov. 4, 2014

(65) Prior Publication Data

US 2016/0082605 A1   Mar. 24, 2016

Related U.S. Application Data

(60) Provisional application No. 62/053,576, filed on Sep. 22, 2014.

(51) Int. Cl.
| | |
|---|---|
| B26B 7/00 | (2006.01) |
| B26D 1/00 | (2006.01) |
| B26D 1/30 | (2006.01) |
| B26D 7/08 | (2006.01) |
| B27B 19/00 | (2006.01) |

(52) U.S. Cl.
CPC ............ B26B 7/00 (2013.01); B26D 1/30 (2013.01); B26D 7/086 (2013.01); B27B 19/008 (2013.01); B26D 2001/006 (2013.01)

(58) Field of Classification Search
CPC ..... B27B 19/006; B27B 19/008; B27B 19/10; B27B 19/12; B27B 19/14; B27B 19/00
USPC ........................................... 30/355, 392–394
See application file for complete search history.

(56) References Cited

U.S. PATENT DOCUMENTS

| | | | |
|---|---|---|---|
| 607,107 A * | 7/1898 | Wuest | B23D 61/123 |
| | | | 30/502 |
| 709,857 A | 9/1902 | Anderson | |
| 770,094 A * | 9/1904 | McGill | B23D 61/123 |
| | | | 30/502 |
| 3,905,374 A * | 9/1975 | Winter | A61B 17/14 |
| | | | 30/166.3 |
| 3,977,289 A * | 8/1976 | Tuke | A61B 17/14 |
| | | | 30/392 |
| 4,188,952 A | 2/1980 | Loschilov et al. | |

(Continued)

FOREIGN PATENT DOCUMENTS

| | | | |
|---|---|---|---|
| DE | 102009041114 A1 * | 4/2011 | ........... B27B 19/008 |
| EP | 0456470 B1 | 1/1996 | |

(Continued)

OTHER PUBLICATIONS

PCT/US2015/051132 International Search Report and Written Opinion dated Dec. 14, 2015.

*Primary Examiner* — Jason Daniel Prone
*Assistant Examiner* — Richard D Crosby, Jr.
(74) *Attorney, Agent, or Firm* — Paul Y. Feng; One LLP

(57) ABSTRACT

An improved blade for use with an oscillating power tool is disclosed. A rectangular style blade includes side teeth to eject debris and allow rapid but well controlled blind plunge cuts. The side teeth are preferably asymmetric with a forward orientation to bias debris out and the blade inward. Preferably one or more openings or slots allow for additional debris removal. The side teeth also allow for controlled side cutting.

16 Claims, 2 Drawing Sheets

(56) References Cited

U.S. PATENT DOCUMENTS

| | | | | |
|---|---|---|---|---|
| 4,454,901 | A * | 6/1984 | Thorsness | B23D 61/021 144/218 |
| 4,513,742 | A | 4/1985 | Arnegger | |
| 4,920,652 | A * | 5/1990 | Johnson | B23D 59/04 30/166.3 |
| 5,201,749 | A | 4/1993 | Sachse | |
| 5,265,340 | A | 11/1993 | Nitz | |
| 5,306,285 | A * | 4/1994 | Miller | B23D 61/006 30/355 |
| 5,423,845 | A | 6/1995 | McDaniel | |
| 5,456,011 | A * | 10/1995 | Inkster | B23D 61/006 30/293 |
| 5,697,835 | A * | 12/1997 | Nitz | B23D 61/006 125/15 |
| D406,223 | S * | 3/1999 | Tran | D8/70 |
| 5,964,039 | A * | 10/1999 | Mizoguchi | B23D 49/165 30/124 |
| 6,503,253 | B1 * | 1/2003 | Fletcher | B23D 51/10 606/79 |
| 6,684,481 | B2 * | 2/2004 | Kullmer | B23D 61/006 29/412 |
| 7,527,628 | B2 * | 5/2009 | Fletcher | A61B 17/14 606/177 |
| 7,574,803 | B2 * | 8/2009 | Parker | B23D 49/11 30/122 |
| 7,784,143 | B1 * | 8/2010 | Murray | E04G 21/20 148/588 |
| D681,082 | S * | 4/2013 | Neal, Jr. | D15/139 |
| 8,568,204 | B2 | 10/2013 | Steiger | |
| 8,875,611 | B2 * | 11/2014 | Mann | B23D 61/006 30/339 |
| 8,936,597 | B2 * | 1/2015 | Wang | A61B 17/141 606/171 |
| 9,027,452 | B2 * | 5/2015 | Nagy | B23D 61/006 30/348 |
| D741,126 | S * | 10/2015 | Sis | D8/20 |
| 2002/0104421 | A1 | 8/2002 | Wurst | |
| 2003/0014067 | A1 * | 1/2003 | Kullmer | A61B 17/14 606/176 |
| 2003/0014869 | A1 * | 1/2003 | Rack | B23D 61/126 30/353 |
| 2004/0098000 | A1 | 5/2004 | Kleinwaechter | |
| 2005/0262702 | A1 * | 12/2005 | Hawthorn | B23D 61/126 30/166.3 |
| 2006/0016315 | A1 * | 1/2006 | Zorich | B23D 61/025 83/835 |
| 2006/0137498 | A1 * | 6/2006 | Bowling | B23D 49/11 83/13 |
| 2006/0162526 | A1 * | 7/2006 | Nagano | B23D 61/121 83/835 |
| 2007/0074406 | A1 * | 4/2007 | Magyla | B23D 49/11 30/392 |
| 2007/0123893 | A1 * | 5/2007 | O'Donoghue | A61B 17/142 606/82 |
| 2011/0046627 | A1 * | 2/2011 | Kim | A61B 17/142 606/82 |
| 2011/0256814 | A1 | 10/2011 | Steiger | |
| 2012/0144676 | A1 * | 6/2012 | Davidian | B25F 3/00 30/142 |
| 2012/0311876 | A1 | 12/2012 | Zhang | |
| 2013/0193655 | A1 * | 8/2013 | Kaye, Jr. | B27B 19/006 279/141 |
| 2013/0331013 | A1 * | 12/2013 | Neal, Jr. | B23D 61/006 451/461 |
| 2014/0230626 | A1 | 8/2014 | Puzio | |
| 2016/0082605 | A1 * | 3/2016 | Marks | B26B 7/00 30/355 |

FOREIGN PATENT DOCUMENTS

| | | |
|---|---|---|
| EP | 0487948 B1 | 8/1997 |
| EP | 1736107 A1 | 12/2006 |
| EP | 2295211 A1 | 3/2011 |
| EP | 2364806 B1 | 3/2013 |
| FR | 986764 | 8/1951 |
| WO | WO9908617 A1 | 2/1999 |
| WO | WO2012013389 A1 | 2/2012 |

* cited by examiner

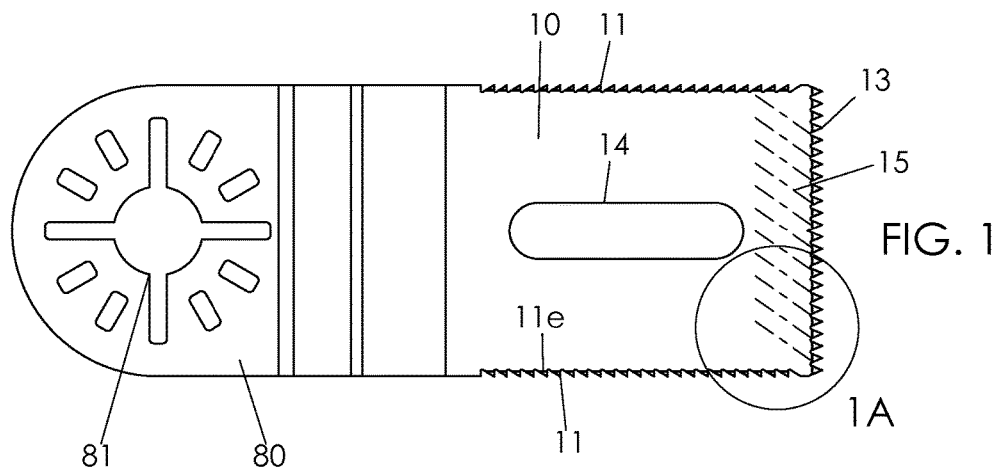
FIG. 1
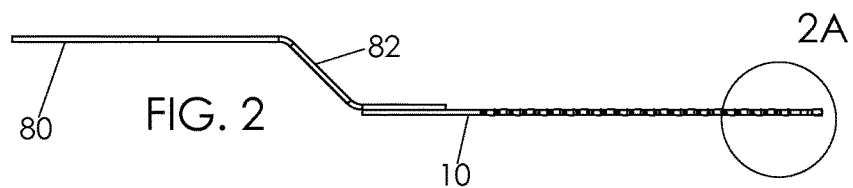
FIG. 2
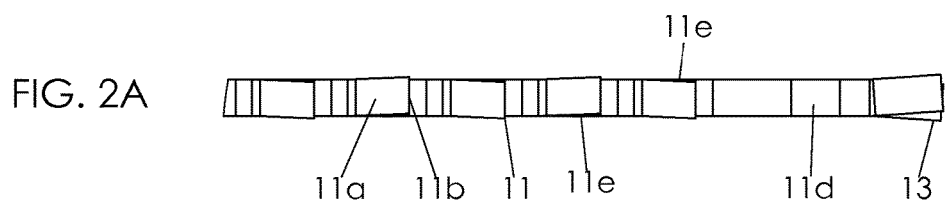
FIG. 2A
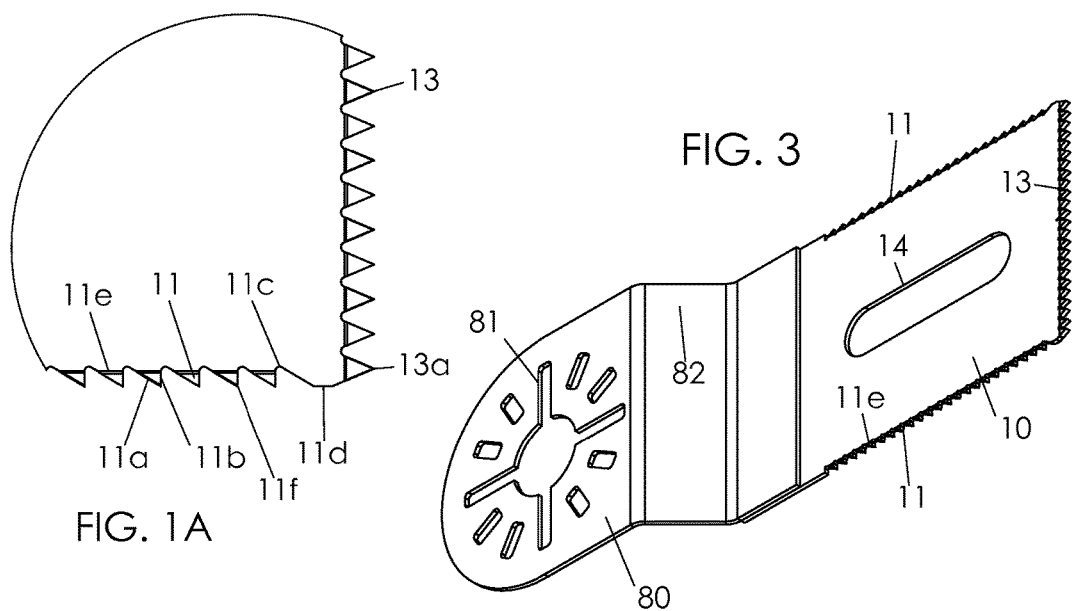
FIG. 1A
FIG. 3

CUTTING BLADE FOR OSCILLATING TOOL

CROSS-REFERENCE TO RELATED APPLICATIONS

This non-provisional application claims benefit of priority from U.S. provisional application No. 62/053,576, filed on Sep. 22, 2014, the contents of which are hereby incorporated by reference.

FIELD OF THE INVENTION

The present invention relates to oscillating power tool cutting blades. More precisely the present invention includes improvements to a toothed such blade.

BACKGROUND OF THE INVENTION

Oscillating power tools employ side to side vibratory motion to cut or work upon materials. A rear mount of the blade removably attaches to a head of the power tool. A working front element of the blade is further attached to the rear mount portion, typically permanently. In one common configuration, the working end is of sheet metal or similar flat form including a toothed front end. This blade moves against a work piece to cut into the piece. Such blade most often is of elongated rectangular shape with straight edged sides and teeth distally positioned along the front edge. The rectangular blade shape is useful for its ability to make controlled slot sizes and locations, while other shapes such as round with peripheral teeth are known and commonly used for side cuts and drywall for example. Other shapes include tapered with a wider front end and narrower portion to the rear. These blades can provide blind plunge cuts where a cut is closed at both sides. However, they provide limited control in holding a side position whereby the width of a cut can be hard to control.

The rectangular configuration is particularly popular among the available blade styles. It works adequately for cutting narrow items such as loose wood moldings or metal bars. In this case the blade is wider than the object to be cut and the slot that results is exposed on both sides. In this manner the saw dust or equivalent debris can readily be ejected sideways out from the cut. Similarly a cut may be done at one edge of the work piece; the debris then ejects out of the one exposed side for reduced but still usable results. However when this type of blade is used for a blind plunge cut, with the cut slot closed at both ends, there is no practical exit opening, channel, or action for the debris.

The blind plunge cut is especially common in wood. As the wood work piece becomes thicker the effect of the blocked exit channel becomes more pronounced. For example, common wood cutting blades are rated for up to a 2 inch nominal wood thickness, or about 1.5 actual inches deep. In fact such cuts with prior rectangular blades are not practical without undo effort and stress upon the tool and user. Therefore a conventional rectangular blade can cut a central area of a thick work piece only by plunging progressively across the width of the work piece from an edge.

A further limitation of the rectangular blade is its inability to cut directly sideways from an initially cut slot. To create a wider slot, for example to fit an electrical switch box in a wood or other panel, a further plunge cut is required adjacent to a prior one. This is not convenient and is hard to control the slot position and size.

SUMMARY OF THE INVENTION

In a preferred embodiment of the present invention, a preferably rectangular oscillating tool blade cuts quickly and efficiently into a work piece. It further allows sideways enlargement of a slot. The blade includes improvements to the ejection of cutting debris such as sawdust. In a preferred embodiment the blade includes teeth along at least one side edge of the blade, at or near perpendicular to the front edge. Preferably the side teeth are relatively fine, for example a spacing of about 0.060 or other spacing. A fine tooth pattern allows more precise side position control during a plunge cut while an optionally coarser tooth will gouge into the slot sides and provide less side guidance to the blade.

Although the preferred embodiment blade is a rectangle in its working end or front element, other equivalent shapes may be used including with an arcuate front or sides that are not precisely parallel but maintain a substantially rectangular shape whereby the front end is a same or very nearly same width as rearward portions of the blade. In particular, the front end is not functionally wider than the rearward portions. In the present context, rectangular refers to the portion of a rectangle described by the sides and front end of a working end of the blade, wherein the shape at the rear mounting end is not so limited. Rectangular shapes also includes the subset of square shapes. Working end may describe the portion of the blade that can normally enter the cut slot.

The teeth further are preferably oriented to point generally forward, with a rearward angled edge on a rear of each tooth. This angled edge will move debris out of the slot along the sides of the blade. A non-oriented tooth, for example a symmetric tooth, or a rearward oriented tooth will also provide advantage over smooth edge. However, the preferred orientation will actually help draw the blade into the work as the angled edges of the side teeth cam against the work piece slot sides. This inward bias has been observed in tests whereby the blade can progress into a deep wood slot with only minimal force, such as ounces, applied on the power tool sufficient only to maintain contact at the blade front end. A 1.5 inch depth is readily achieved with minimal stress. With rearward oriented teeth the required force is higher. In contrast, with no features of the invention, it is barely possible to cut 1.5 inches deep whereby the blade binds and overstresses the tool motor and user. This binding is apparent to a user as excess vibration of the tool body.

A further feature according to a preferred embodiment of the invention includes an open slot or slots along a length of the blade. This slot allows a further exit channel for debris. It has been observed that a dense stream of debris shoots out of this channel or channels, especially in deep cuts.

If the blade is held near the rear portion of the front element and/or it is moved slowly in and out, a smooth sideways cutting action is possible, in particular in panel type materials such as plywood, although widening is also possible in thicker materials. An initial slot can thereby be widened. This is not possible with a conventional rectangular toothed blade.

BRIEF DESCRIPTION OF THE DRAWINGS

FIG. 1 is a top view of a cutting blade of a preferred embodiment of invention.

FIG. 1A is a detail view of a front corner of the blade of FIG. 1.

FIG. 2 is a side elevation of the cutting blade of FIG. 1.

FIG. 2A is a detail view of a front end of the blade of FIG. 2.

FIG. 3 is a perspective view of the cutting blade of FIG. 1.

DETAILED DESCRIPTION OF THE PREFERRED EMBODIMENTS

Figure 4:
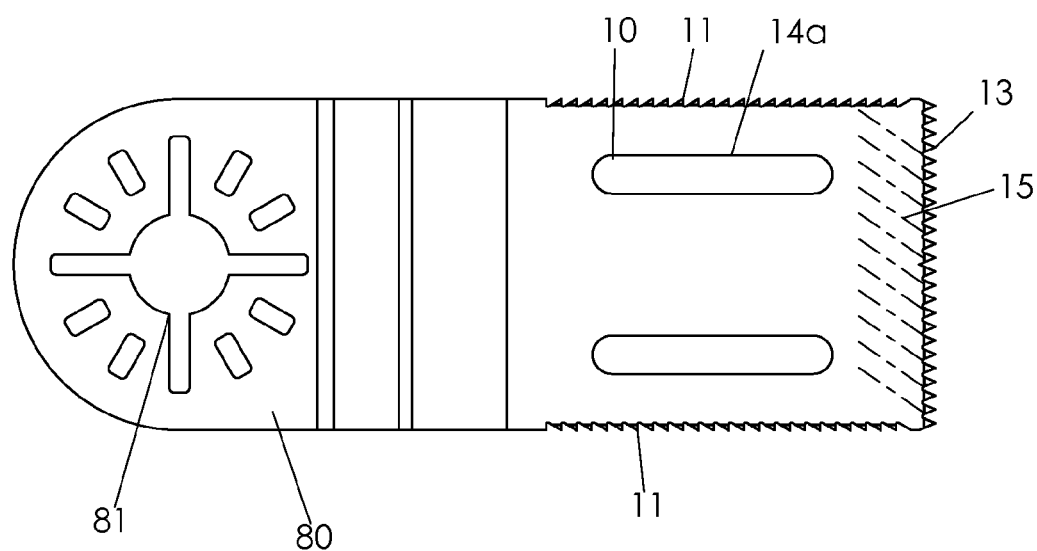
FIG. 4 is a top view of an alternative embodiment cutting blade with two openings.

FIGS. 1 to 3 show an oscillating tool blade according to a preferred embodiment of the invention. Rear mount 80 is at a rear length of the tool blade. Mount 80 includes openings 81 or equivalent structures to fit upon an oscillating power tool head. These features are often configured to fit multiple brands of such tools. The power tool, not shown, is typically hand held and provides an oscillating motion to the blade, rotating about the circular opening of 81 and thereby up and down at the right front end in FIG. 1. Segment 82 often is angled to hold the working element 10 out of plane from the rear mount and may be considered a portion of the rear mount. A solution is desired for practical blind plunge cuts with an oscillating tool that provides reduced stress and a slot widening ability.

Cutting teeth 13 are typically cut into the distal end of working end or front element 10 as shown. As best seen in FIG. 2, mounting end 81 and working end 10 are joined at a two layer portion of the blade. The front element normally can enter a slot up to the two layer portion upon which the added thickness substantially prevents further entry. Therefore, any part of working end or front element 10 up to this thicker area can provide cutting or other action within a cut slot. Alternatively described, the working end or front element is the portion of the blade that is able to enter and operate within a cut slot. In some alternative embodiments (not shown), the front element may extend rearward to near or past the mounting end. For example, a wider front element could have edges extending rearward beside the mounting end. The front end may be vertically straight as shown or arcuate with a central area extending further than the corner areas. In either case the front end is, preferably, substantially perpendicular to the length of the blade. The horizontal or lengthwise edges are typically smooth. In accordance with the drawings, horizontal refers to the length direction of the blade. Teeth 11 or equivalent multiple spaced pointed serrations are a feature of the preferred embodiment and are preferably fitted to both elongated edges as shown although they may be included on only one edge. For example if cuts are done where one side of the cut slot terminates against a hard or other material it may be preferred that an edge contacting such material remain smooth. The horizontal edges extend rearward from the front end along a substantial majority of the length of the working front element 10. Optionally, the horizontal edges may include local notches, narrow sections, or equivalent features (not shown) while the front end maintains its rectangular functional shape.

As shown side teeth 11 extend along most of the edge for example for a length of 1.5 inches to accommodate such slot depths. As shown side teeth 11 preferably begin near the front end, although they may start rearward of this position. It has been found that the side teeth provide a benefit up to the intended cut depth. As seen in FIG. 1A side teeth 11 are preferably oriented forward. As shown each tooth has a front edge 11b perpendicular, or nearly so, to the side and a rear edge 11a angled for example between 30 to 60 degrees from the side elongated direction. As the blade moves sideways, vertical in FIG. 1A, edge 11a presses the slot sides and a cam action from angled edge 11a biases the blade forward. Teeth 13 then cut into the slot bottom. Side teeth 11 also assist ejecting debris. Angled edge 11a pushes debris out of the slot, to the left in FIG. 1A. Optionally, other edge angles may be used or the side teeth may be symmetric as front teeth 13 are illustrated to be.

Preferably the teeth include a kerf as visible in FIG. 2A. It is seen that teeth 11 and teeth 13 are alternately oppositely bent out of a plane described by a face of the front blade element. As applied to side teeth 11 the kerf maintains a widened slot to further help eject debris. With only front teeth 13 including a kerf the slot material can swell as the blade progresses deeper to close off some of the debris channel and bind the blade. As seen in FIG. 2A, the kerf increases the effective thickness of the blade along each side edge of the blade working end. This thickness increase preferably begins at the plane of the blade face at inside corner 11e of the kerf, FIGS. 1A, 2A, to a maximum effective kerf width at tip 11f of each tooth where the tip is bent furthest from the plane of the blade face. FIG. 3 shows the relative location of the kerf of these thickened edges along teeth 11. With the kerf on the side teeth the slot is held wider than the blade, along the area of the thickened edges at teeth 11 to create an enlarged debris channel along a side edge of the blade working end. As discussed above the blade moves vertically, or laterally, in FIG. 1. The kerf corresponding to teeth 11 likewise moves laterally with the blade within the debris channel. From this motion the debris channel of the kerf on teeth 11 is thus wider laterally at a particular tooth 11 location than a length of such tooth from an inside corner 11c to a point 11f. In contrast, a longitudinal motion of the blade, sideways in FIG. 1, would create an enlarged channel only in thickness while being no wider laterally than a length of the tooth 11. The side edge debris channel is thus both widened across a thickness of the blade and widened laterally along the blade by motion of the kerf of teeth 11. The enlarged debris channel is elongated along a length of the blade corresponding to the horizontally extending direction of teeth 11 in the Figures. At least the debris channels prevent the slot from binding against the blade. However, optionally one or more edges may not include a kerf.

For effective position control in cutting a slot, it is preferred that distal teeth 13 extend across a full width of a cutting blade. This further enables cleanly cutting a wall molding for example or other confined work piece fully down to an inside corner at a floor, wall, or other confining object. This feature of the invention thereby retains an important function of rectangular blades in this use. In contrast, a rounded, chamfered, or ill-defined blade corner will not cut into the inside corner of a work area such as the above example without also damaging objects beyond that intended to be cut. Accordingly as seen in FIG. 1A, the preferred embodiment of the invention maintains a well-defined blade corner with teeth 13 positioned to a practical extent at a corner of the rectangular blade at terminating tooth 13a. In FIG. 1A the position of side teeth 11 is shown in relation to front teeth 13. Tooth 13a is laterally aligned, vertical in FIG. 1A, with the location of teeth 11. As shown, a base of tooth 13a, the widest part of the tooth, overlaps at least in part laterally with a length of a tooth 11 where such length extends between inside corner 11c and tip 11f. Preferably, portion 11d forms an outer base of tooth 13a and terminates as shown laterally at a substantially same position as a tip of teeth 11. As a result, the base of tooth 13a will contact a confining object before a point 11f of teeth 11; accordingly, the confining object behind the work piece will not be easily damaged. To provide this forward pointed corner termination, while maintaining structural integrity for the mounting of tooth 13a, portion 11d of the blade side edge as shown does not include teeth 11 or other substantial perturbations and provides a distance of at least one tooth 11 spacing as shown between a first tooth 11 and corner tooth 13a. Portion 11d includes shallow corners as shown, however these do not form structures equal in size or proportions to a tooth 11 and thus will help to protect confining objects.

For both shallow panel cuts and deep cuts side teeth 11 provide advantage for faster lower stress cutting operations. While teeth 11 may be considered cutting teeth they also serve a non-cutting function as described wherein teeth 11 guide, scoop or urge debris out from a cut slot. If follows that teeth 11 need not be sharply pointed for debris clearance although points are helpful for the side cutting function.

A typical material from which to make a blade is high carbon or spring type steel. The entire front element including the teeth are of a same material. This is economical, resilient and well suited for standard use against wood. A further option is bi-metal. In this construction the sheet metal body of the working element is spring steel while the teeth area is a strip of harder steel material. This provides a resilient body with harder teeth suited for wood or many metals. Another option is carbide teeth or strip bonded to the element body.

In a single material spring steel working element, the front teeth 13 and side teeth 11 are naturally of a same material. In a bi-metal blade, the side teeth as well as the front teeth may optionally be of the harder steel whereby the harder material partially surrounds the working element on the sides and front. For manufacturing efficiency of the bi-metal design the hard steel strip may be limited to the front area while side teeth are of the main spring steel material. It can be expected that the front teeth benefit most from a harder material since the main cutting action occurs there while the side teeth do some cutting but primarily guide debris out of the slot and, in the preferred embodiment, help draw the blade into the slot. Similarly side teeth 11 may be used with a carbide toothed design, with carbide limited to front teeth 13 or used on both front and side teeth.

In FIGS. 1 and 3, opening 14 is seen in working element 10. Opening 14 is preferably elongated as shown. For deeper cuts opening 14 provides an additional elongated ejection channel for debris. Opening 14 creates a recess open at the top of the cut slot (near the rear of the working element) with the other end of the recess terminating within the slot near the front of the element. Therefore, as debris randomly moves upon the top and bottom faces of the working element some of it will enter opening 14 and will be biased to exit toward the open top. A powerful stream of such debris has been observed in deep cuts. This stream continues, although more limited, even if the blade is deep enough that opening 14 is fully within the cut slot but still near to the top of the slot.

Opening 14 provides advantage by itself without side teeth 11 and deep cuts are more easily accomplished with just opening 14. When side teeth 11 and opening 14 are combined to form multiple debris channels, deep cuts are for the first time especially practical with a rectangular oscillating blade. In FIG. 4 two slots 14a are substantially parallel toward each respective side of the blade. This configuration can provide faster debris removal and thus further increased cutting speed. As seen in FIG. 3 and described above slot 14 and the kerf at the side edges along teeth 11 create distinct elongated debris channels to provide one or more open spaces in a slot within or beyond the majority blade thickness for debris to escape.

Opening 14 may be of other shapes including circular, oval or multiple parallel slots. In alternative embodiments, grooves or out of plane features may be included. For example, in FIG. 1 grooves or corrugations 15 are schematically shown. Such grooves or corrugations may be on one or both sides of working element 10 and may guide debris for removal along with or instead of opening 14. The grooves may extend a length of the working element for example to a depth of 1.5 inches. The grooves may be angled as shown, longitudinal or other orientation.

Side teeth 11 provide a further benefit that the blade can cut sideways from an initial slot, up and down in FIG. 1, even as there is minimal scraping action on the side teeth. Such scraping motion is right-left in FIG. 1. There is some practical scraping motion closer to the rear of the working element, near the left termination of side teeth 11 in FIG. 1 and side cutting occurs here readily. This scraping action is from the rotation at mount 80. However at any position of side teeth 11 a side cutting action results if the oscillating tool is slowly moved in and outward. This low effort action causes the points of teeth 11 to cut into differing locations of the slot sides thereby disrupting the side material and allowing it to be dislodged. This effect has been demonstrated in wood panels for example. Although it does not normally provide high speed side cutting this feature allows expansion of a slot width without progressive plunge cutting. Thus side cutting with the blade of the invention allows precise controlled widening for example of an electric box opening.

In the present invention a simple single plane sideways vibratory motion on a blade is used to actively bias cutting debris to exit in a direction perpendicular to the vibratory motion. In this manner a conventional oscillating power tool function is improved without modification to the tool or its tool head.

While particular forms of the invention have been illustrated and described, it will be apparent that various modifications can be made without departing from the spirit and scope of the invention. It is contemplated that elements from one embodiment may be combined or substituted with elements from another embodiment.

What is claimed is:
1. A cutting blade for an oscillating power tool to cut a slot in a work piece comprising:
   a rear mount;
   a length of the cutting blade from the rear mount toward a front working element;
   the front working element including a toothed distal front end substantially perpendicular to the length of the cutting blade and a corner terminating front tooth of the toothed distal end, the toothed distal front end acting as the main cutting teeth;
   side edges of the cutting blade substantially parallel to the length of the cutting blade extending rearward from an opposed corner terminating front tooth whereby the front element describes a rectangle exclusive of the rear mount, the side edges including side edge teeth;
   the blade moving sideways in a vibratory motion when operated by the power tool to cause the main cutting teeth to move laterally;
   the blade including a plane of a face of the blade, the side edge teeth being bent out of the plane to form a side edge kerf along the side edges of the blade;

wherein a majority of the blade front working element includes a first blade thickness, and local portions of the blade working element include a second thickness, the local portions extending a substantial majority of the length of the blade front working element along the side edges of the blade from a forward location of the blade to a rearward location of the blade working element, and the first blade thickness is less than the second local portion thickness;

the corner terminating front tooth includes an outer base, an elongated portion of the outer base being absent a tooth structure, the elongated portion positioned in front of the side teeth and behind the corner terminating front tooth; and the corner terminating front tooth meeting an adjacent front tooth at an inside rear vertex, the elongated portion of the outer base extending rearward to a location of the blade side edge substantially rearward of the inside rear vertex.

2. The cutting blade of claim 1, wherein teeth of the distal end include a shape with respect to a top view of the cutting blade, a distal front end of the blade being perpendicular to the length the tooth shape including two opposed edges of the tooth terminating at a tooth point, and the opposed edges being angled to a same extent with respect to the distal front end of the blade.

3. The cutting blade of claim 1, wherein a tooth of each side edge includes a rear tooth edge and a front tooth edge, the rear and front tooth edges each being at an angle with respect to the side edges of the blade in the top view, and the rear tooth edge is at a smaller angle than the angle of the front edge whereby the tooth is angled toward the distal front end, and the vibratory motion of the blade causing a cam action as the rear tooth edges press sides of the slot, the cam action biasing the blade forward.

4. The cutting blade of claim 3, wherein the side teeth are spaced apart 0.06 inch.

5. The cutting blade of claim 1, wherein a face of the front element includes at least one groove extending rearward at least partially along the length of the cutting blade from near the front end.

6. The cutting blade of claim 1, wherein the front element includes an opening in a face of the blade, and the opening is elongated along the length of the blade to form an enlarged debris ejecting channel of the blade working end.

7. The cutting blade of claim 1, wherein the elongated portion extends parallel to the blade side edge a distance of at least one side tooth spacing between a front most side tooth and the corner terminating front tooth, the side teeth begin near the front end, the outer base extends laterally to a termination at a same lateral position as a tip of a proximate side tooth.

8. The cutting blade of claim 1, wherein front teeth of the toothed distal front end form a kerf extending perpendicular to the kerf of the side edge teeth.

9. A cutting blade for an oscillating power tool comprising:

a working element of substantially flat form including a toothed front end and with side edges extending rearward from of the front end;

the side edges being parallel to each other and lengthwise for a majority of the length of the working element;

the toothed front end including a corner terminating front tooth at respective corners, each corner terminating front tooth having an outer base to form a pair of outer bases;

the side edges each including multiple pointed teeth along at least a portion of the side edges including a first side tooth rearward of each corner terminating front tooth to form a pair of opposed first side teeth;

the blade having a first lateral width extending between the outer bases of each corner front tooth and a second lateral width between the tips of the opposed first side teeth, the first width being not less than the second width; and wherein the outer bases include an elongated portion absent a tooth structure, the elongated portion positioned in front of the side teeth and behind the corner terminating front tooth; the elongated portion of the outer base extending laterally to a termination at a same lateral position as a tip of a proximate side tooth.

10. The cutting blade of claim 9, wherein the elongated portion extends parallel to the blade side edge a distance of at least one side tooth spacing between a front most side tooth and the corner terminating front tooth.

11. The cutting blade of claim 9, wherein the teeth of the side edges are bent out of a plane of the working element to form an increased thickness side edge of the working element corresponding to a widened debris ejecting channel.

12. The cutting blade of claim 11, wherein the side teeth are angled toward the front end including a front edge substantially perpendicular to the side edge and a rear edge angled to the side edge.

13. The cutting blade of claim 9, wherein the working element includes an opening.

14. The cutting blade of claim 13, wherein the opening terminates rearward of the front end.

15. The cutting blade of claim 14, wherein the opening is elongated lengthwise.

16. A cutting blade for an oscillating power tool to cut a slot in a work piece comprising:

a rear mount;

a length of the cutting blade extending from the rear mount toward a front working element;

the front working element including a toothed distal front end substantially perpendicular to the length of the cutting blade and a corner terminating front tooth of the toothed distal end;

side edges of the cutting blade substantially parallel to the length of the cutting blade extending rearward from the front end, wherein the front element defines a rectangle exclusive of the rear mount;

the side edges each including side teeth, the side teeth beginning near the front end, the side teeth being angled toward the distal front end with respect to a top view of the blade, with the blade including a side elongated direction, a rear tooth edge of a side tooth being at a first angle relative to the side elongated direction, a front edge of the side tooth being at a second angle in relation to the side elongated direction, the first angle being less than the second angle; and the blade moving in a vibratory motion when operated by the power tool to cause a cam action as the rear tooth edges press sides of the slot, the cam action biasing the blade forward, wherein each side edge includes an elongated portion, extending substantially parallel to a position laterally aligned with tips of the side teeth.

* * * * *